US007824108B2

(12) United States Patent
Feldner

(10) Patent No.: US 7,824,108 B2
(45) Date of Patent: Nov. 2, 2010

(54) CONNECTION DEVICE WITH CONDUCTOR LENGTH COMPENSATION

(75) Inventor: Ralf Feldner, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 12/425,544

(22) Filed: Apr. 17, 2009

(65) Prior Publication Data

US 2009/0264021 A1 Oct. 22, 2009

(30) Foreign Application Priority Data

Apr. 18, 2008 (DE) ...................... 10 2008 019 758

(51) Int. Cl.
*G02B 6/38* (2006.01)

(52) U.S. Cl. ........................................ 385/56; 439/320

(58) Field of Classification Search ............. 385/53–56, 385/70–71, 76–78, 88–89, 92, 94, 139; 439/320, 439/449–459, 461, 577, 587, 589, 274
See application file for complete search history.

(56) References Cited

U.S. PATENT DOCUMENTS 4,047,797 A * 9/1977 Arnold et al. ................. 385/78
4,784,455 A 11/1988 Sladen et al.
4,784,744 A 11/1988 Rudnick
5,418,874 A 5/1995 Carlisle et al.
7,074,066 B2 * 7/2006 Pepe .......................... 439/321
7,270,485 B1 9/2007 Robinson et al.
7,357,579 B2 4/2008 Feldner et al.
7,641,396 B2 * 1/2010 Feldner ....................... 385/56
2007/0082552 A1 * 4/2007 Feldner ...................... 439/607

FOREIGN PATENT DOCUMENTS

DE 102006000702 4/2007
DE 112005000697 4/2007

* cited by examiner

*Primary Examiner*—Javaid Nasri
(74) *Attorney, Agent, or Firm*—Leydig, Voit & Mayer, Ltd.

(57) ABSTRACT

A connection device for connecting a cable having at least one signal conductor to a signal connector. The connection device including a housing, the at least one signal conductor being disposed in the housing, the housing having at least one securing device configured to detachably secure the housing to the signal connector. The connection device further includes a plug disposed on the housing, the plug having a locking mechanism. The housing has a strain relief device configured to provide strain relief for the plug. A deflection device is configured to deflect the at least one signal conductor into a deflected position so that a movement of the at least one housing portion of the housing relative to the plug results in a defined lateral movement of the at least one signal conductor so as to provide a corresponding length compensation.

16 Claims, 2 Drawing Sheets

CONNECTION DEVICE WITH CONDUCTOR LENGTH COMPENSATION

CROSS REFERENCE TO PRIOR APPLICATIONS

Priority is claimed to German Patent Application No. 10 2008 019 758.0, filed on Apr. 18, 2008, which is hereby incorporated by reference herein.

FIELD

The preset invention relates to a connection device for connecting a cable, an in particular an optical waveguide, to a signal connector, for example, of an electrical or optical device including a housing which is provided with a plug for insertion into a corresponding socket of the signal connector.

BACKGROUND

Connection devices for connecting a cable to a signal connector, and especially to a communication device, such as a computer, a notebook or a telephone, are commonly used in practical applications. In such applications, the plug connected to the cable is inserted into a corresponding socket of the electrical device.

Connection devices for electrical cables usually include an eight-pin plug, generally known as RJ-45 plug or Western plug, on the cable side and a corresponding socket on the equipment side. The plug is generally attached to cable using the crimp connection technique, but may also be soldered thereto. Usually, the plug is locked within the socket by a latching arm as it is inserted therein, but may also be retained by fastening hooks provided on the socket or on the electrical device, or may be screwed to the electrical device.

In addition, there are connection devices for optical cables, i.e., for optical waveguides. An optical waveguide is an optical device which is suitable for transporting light and is often formed of a multiplicity of individual glass fibers or plastic fibers, especially polymer fibers, which are very thin in relation to their length and which are combined into a bundle. In the following, the term "optical waveguide" will be understood to also include one having a single fiber. The individual glass fibers or plastic fibers are generally surrounded by a plastic jacket. Compared to electrical signals, the much higher carrier frequency of light allows more data to be transmitted in the same period of time, or the same amount of data to be transmitted in a shorter time than with conventional coaxial cables. Moreover, optical waveguides are free of EMC problems. Compared to glass fibers, polymer fibers have much higher attenuation values and larger diameters, but they are inexpensive and easier to install.

Due to the increasing use of optical waveguides, there is a growing demand for easy-to-use and quickly connectable connection devices for optical waveguides (fiber optic plugs).

Fiber optic connection technology uses a variety of standard connectors which are incompatible with each other. The standard fiber optic plugs most frequently used are the ST plug, the PC/FC plug, and the SC plug, the latter finding increasing application.

The SC plug is a polarized, push-pull type fiber optic plug of small dimensions and high packing density. This plug is square in configuration and can be used for multimode fibers and monomode fibers. This plug allows establishment of simplex, duplex and multiple connections. Due to its design, it can be nonrotatably connected to the corresponding socket and be automatically locked therein.

In order to release such a fiber-optic plug from the corresponding socket, it is necessary to pull the plug housing about 1 to 2 mm axially away from the socket. This produces the desired movement of the outer plug housing relative to the inner housing accommodating the ferrules, thereby releasing the mechanical interlock between the inner housing of the plug and the corresponding socket.

However, the disadvantage here is that the standard fiber-optic plugs can be used only to a very limited extent in a rough industrial environment.

German document DE 10 2006 000 702 A1 describes a connection device which provides reliable mechanical protection of the plug and the optical waveguide to be connected. To this end, the connection device is provided with an additional mechanical securing means in the form of a resilient latching means capable of absorbing and transferring large tensile forces.

SUMMARY

An aspect of the present invention is to provide a different connection device which also provides reliable mechanical protection of the plug and the optical waveguide to be connected.

Another, alternative, aspect of the present invention is to provide a plug that is easily assembled with and disassembled from a corresponding socket.

In an embodiment, the present invention provides a connection device for connecting a cable having at least one signal conductor to a signal connector. The connection device includes a housing, the at least one signal conductor being disposed in the housing, and the housing having at least one securing device configured to detachably secure the housing to the signal connector. The connection device includes a plug disposed on the housing, the plug having a locking mechanism. The housing has a strain relief device configured to provide strain relief for the plug. A deflection device is configured to deflect the at least one signal conductor into a deflected position so that a movement of the at least one housing portion of the housing relative to the plug results in a defined lateral movement of the at least one signal conductor so as to provide a corresponding length compensation.

BRIEF DESCRIPTION OF THE DRAWINGS

An exemplary embodiment of the present invention is shown in the drawings in a purely schematic way and will be described in more detail below. In the drawings.

DETAILED DESCRIPTION

Figure 1:
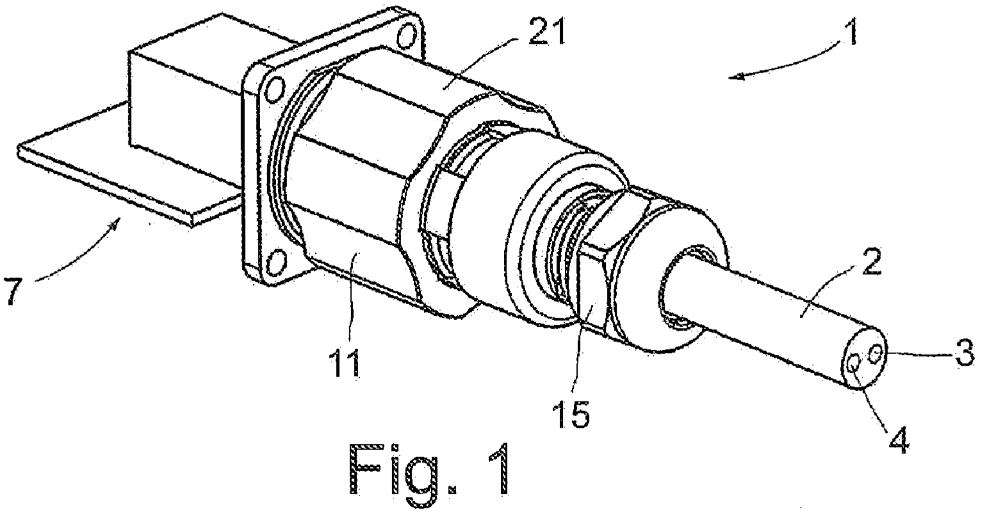
FIG. 1 is a perspective overall view of a connection device according to an embodiment of the present invention.

The inventive connection device for connecting a cable to a signal connector includes a housing and at least one plug provided on said housing. The cable contains at least one signal conductor and preferably at least one optical waveguide. However, the connection device of the present invention may also be provided with electrical conductors.

The plug of the connection device according to an embodiment of the present invention has a locking mechanism which is lockable and releasable by moving at least one housing part of the housing relative to the signal conductor. The housing is provided with at least one additional securing device allowing the housing to be detachably secured to the signal connector.

The housing is further provided with a strain relief device to strain-relief the plug from tensile forces imparted thereto, for example, via the cable.

The at least one signal conductor is arranged within the housing and is deflected by a deflection device such that when the housing part; i.e., a part of the housing, is moved relative to the plug, the signal conductor is moved laterally in a defined manner, thereby allowing for a corresponding length compensation.

The connection device of the present invention has many advantages. One advantage of the connection device according to an embodiment of the present invention is that the cable containing the at least one signal conductor is received into the housing in a well-protected manner, so that the connection device can also be used in a rough industrial environment. The additional securing device also enables transfer of large tensile forces without damage occurring to the plug or to the cable.

Another advantage is that, due to the deflection device, the signal conductor is moved laterally in a defined manner when the housing part of the housing is moved relative to the plug.

In the case of housings provided with a strain relief device, the cable is fixed relative to the housing. Thus, when the conductor is straight, high stiffness is present, for example, when the conductor is to be compressed lengthwise for releasing or locking purposes. However, longitudinal shortening may be necessary, for example, when the plug is to be locked in position, which requires the housing to be moved relative to the plug in a direction away from the strain relief device. Since, due to its high longitudinal stiffness, a straight signal conductor offers resistance to compression in the longitudinal direction, it is therefore difficult to eliminate the risk of the signal conductor being damaged due to the forces required for compression.

In this connection, the present invention provides the advantage that the signal conductor is diverted or deflected from the straight direction within the housing by means of a deflection device. The point of deflection provides a predetermined bending or kink point, at which the signal conductor is moved outwardly in response to longitudinal compression, thereby reducing the length of the signal conductor in the straight direction. This allows the housing to be moved relative to the plug with little or moderate force. Even if the plug is frequently locked in position and released, there will be no wear or deterioration of the signal conductor or the connection device, which makes it possible to ensure high reliability.

The deflection angle may be 5°, 10°, 15°, 20° or more. The larger the angle, the smaller are the forces, but the more space is needed in the width direction.

Preferably, two signal conductors are provided which are spread apart in a defined manner within the housing by means of a deflection device in the form of a spreading device. The spreading device is preferably configured symmetrically with respect to the longitudinal axis of the connection device. It is also possible to provide more than two signal conductors, for example, 3, 4 or 5 or more signal conductors.

The housing is preferably fixedly joined to the plug or at least to a part of the plug. This allows the plug to move synchronously with the housing.

The strain relief device preferably includes a clamping device which is connected or connectable to the housing and is suitable for secure clamping of the cable. The clamping device may, for example, take the form of a threaded clamping device in which the cable is clamped by means of a threaded connection.

A spring device may be provided to bias the signal conductor, for example, to a less deflected position. Thus, since the spring device deflects the signal conductor to a predetermined position without any external influences, a precisely defined position is achieved, so that defined conditions are present at all times.

Preferably, a less deflected position of the signal conductor corresponds to the released position of the plug, while a more deflected position of the signal conductor corresponds to the locked position of the locking mechanism. This means that in order to move the plug to the locked position, the signal conductor is preferably deflected to a greater extent.

If the signal conductor is biased by a spring device to a less deflected position, movement to the locked position will be against the force of the spring device. During a subsequent movement to the released position, the bias of the spring device causes the signal conductor to be moved, possibly automatically, to a less deflected position, in which its overall length in the longitudinal direction of the connection device increases.

This means that when the housing is moved relative to the plug in a direction away from the plug, the plug is automatically released, because the relative movement is assisted by the spring device. In any case, the release operation is assisted and not hindered by inertial forces. Basically, the signal conductor also acts as a spring.

The mode of operation could also be the other way around, in which case the spring device would bias the signal conductor, for example, to the more deflected position, and a more deflected position of the signal conductor would correspond to the released position of the plug.

In further refinements, the ferrules project forwardly of the plug or housing when the plug is in the released position.

The additional securing device is preferably configured as a threaded securing device or as a latching device. The securing device may include, for example, two resilient latching means or a union nut. A threaded securing device is preferably axially movably and captively received on the housing, while a latching device is preferably formed in one piece with the housing.

The deflection device is preferably provided on a separate insertion member, which is inserted into the housing.

The assembly is preferably effected by first passing the signal conductor or conductors through corresponding apertures in the insertion member. Subsequently, the plug is assembled and inserted into the housing together with the insertion member. The insertion member may be threaded to the housing, possibly with sealing means provided between the insertion member and the housing to prevent ingress of moisture. The end of the insertion member is preferably provided with the strain relief, which may be, for example, a threaded member which is screwed on to firmly hold the cable in the strain relief. Here, too, sealing means may be provided to prevent ingress of moisture or dust at the strain relief.

The plug has at least a two-part plug housing including a first plug housing part and a second plug housing part. More specifically, the first plug housing part accommodates the at least one signal conductor, while the second plug housing part is in coupled connection with the housing. This means that axial backward movement of the housing causes the second plug housing part to move along with it, so that the first plug housing part and the signal conductor held by it will project forwardly of the second plug housing part. The second plug housing part is in particular in the form of an outer plug housing part externally surrounding the inner, first plug housing part.

When the second plug housing part is moved relative to the first plug housing part, the locking mechanism of the plug is released.

The first plug housing part preferably has locking elements which are released when the second plug housing part is moved in a direction relative to the first plug housing part. When the second plug housing part is moved back relative to the first plug housing part, so that the first plug housing part projects forwardly beyond the second plug housing part, the locking mechanism of the plug is released, while movement in the opposite direction causes it to be locked.

Preferably, the plug used on the connection device is one of the types mentioned at the outset. It is particularly preferred to use an SC plug.

In the following, an exemplary embodiment of connection device 1 according to an embodiment of the present invention is illustrated with reference to FIG. 1 through FIG. 6.

FIG. 1 shows connection device 1 in a perspective view, in which the connection device is connected to a signal connector 7 which represents, for example, an electrical or optical device, or is connected thereto.

Connection device 1 is connected to a cable 2 which, in the present embodiment, contains two signal conductors 3 and 4 in the form of fiber optic light conductors or optical waveguides. Signal conductors 3 and 4 are surrounded by a jacket to protect them from damage and environmental influences.

An end of cable 2 extends into connection device 1, where the ends of signal conductors 3 and 4 are bare of insulation and connected to ferrules 20 (see FIG. 3) disposed in a plug 6.

Strain relief is provided by a strain relief device 12 fixedly joined to housing 5 of connection device 1. A clamping device 15, which here includes a nut 15, holds cable 2 to strain relief device 12 in such a way that it is capable of resisting tensile forces.

Plug 6 may be a commercially available SCRJ plug, which has a locking mechanism 8 to reliably hold plug 6 in the socket (not shown) of signal connector 7.

Plugs 6 of this type are not suitable for transferring large tensile forces and, therefore, are difficult to use in a rough industrial environment, in production facilities, or in an outdoor environment, because the environmental conditions and the occurring forces may affect the functioning of the signal connection.

A securing device 11, which here includes a union nut 21, protects the signal connection between connection device 1 and signal connection 7 from mechanical damage and environmental influences. Union nut 21 is screwed onto a corresponding thread on signal connector 7 and may be provided on the inside with a seal to reliably prevent moisture and dust or the like from entering via the thread of signal connector 7. Further, a seal may be provided to seal union nut 21 against housing 5, so as to prevent ingress of moisture and dust also at the rear end of union nut 21.

Union nut 21 of securing device 11 is so rugged that considerable forces can be transferred in the pulling direction. Due to the tension-proof connection of cable 2 to housing 5 via strain relief device 12, tensile forces applied to cable 2 are transferred via housing 5 to securing device 11, and thus, to signal connector 7, the housing of which is designed to resist such loads. This technical approach allows considerable tensile forces to be transferred and dissipated without affecting the functioning of signal connector 1.

Figure 2:
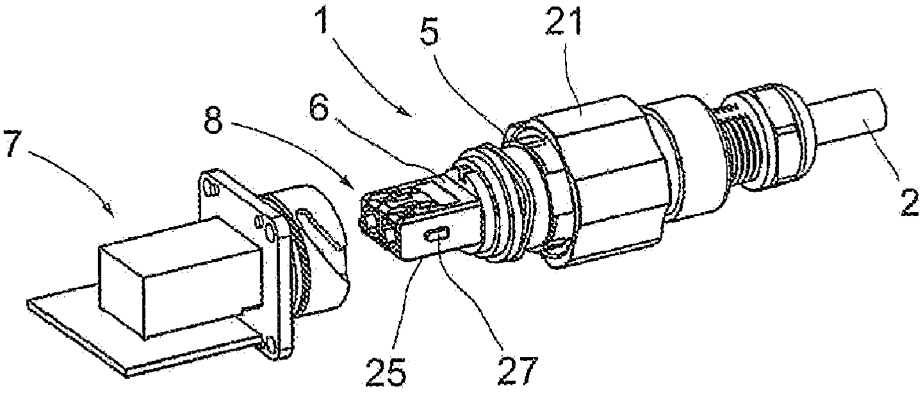
FIG. 2 is a view showing the connection device of FIG. 1 prior to attachment to a signal connector.

FIG. 2 shows connection device 1 and signal connector 7 in a perspective view before plug 6 of connection device 1 is inserted into the corresponding socket (not shown) of signal connector 7 to create the signal connection.

Plug 6 has a plug housing 25 including a first plug housing part 26 and a second plug housing part 27. First plug housing part 26 is an inner plug housing part and is surrounded by an outer, second plug housing part 27. Ferrules 20 of signal conductors 3 and 4 are received and arranged within inner plug housing part 26. Plug 6 includes a locking mechanism 8, which is movable from a locked position to a released position and vice versa. Locking and releasing is accomplished by moving the two plug housing parts 26 and 27 axially relative to each other.

Figure 3:
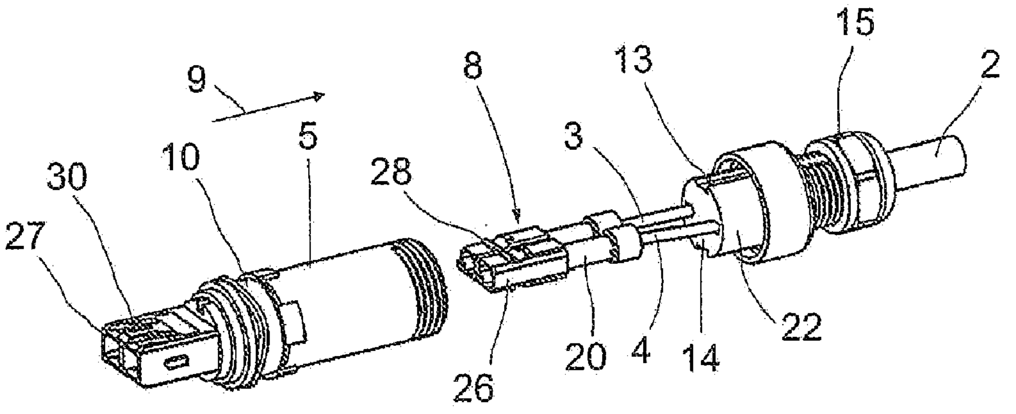
FIG. 3 is an exploded view of the connection device of FIG. 1.

As shown in the exploded view of FIG. 3, locking elements 28 are provided on the upper side of the inner, first plug housing part 26, said locking elements cooperating with apertures 30 in second, outer plug housing part 27.

Figure 4:
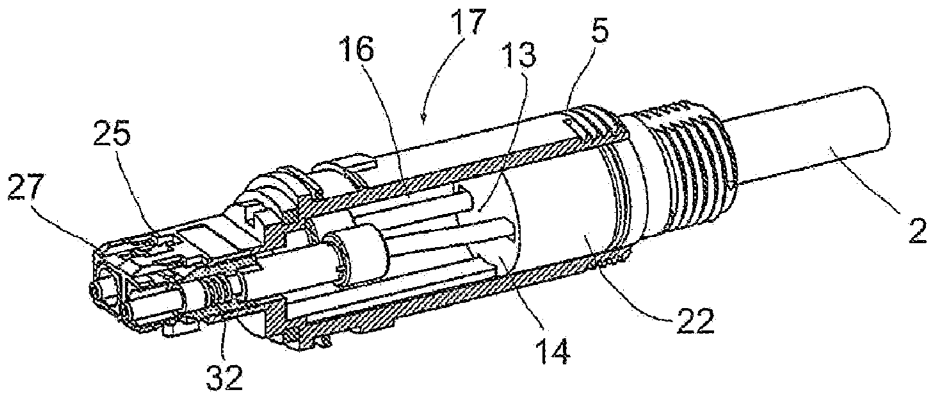
FIG. 4 is a vertical section through the connection device of FIG. 1.

FIG. 4 illustrates connection device 1 in a vertical cross-sectional view in which deflection device 13, here in the form of a spreading device 14, is clearly shown. Spreading device 14 is provided on an insertion member 22 which is inserted into housing 5 from the rear and is provided with openings for passage and deflection of signal conductors 3 and 4. FIG. 4 shows released position 17, in which signal conductors 3 and 4 are deflected to a lesser degree. FIG. 4 also shows a spring device 32 that biases the signal conductors 3 and 4 to the less deflected position.

Figure 5:
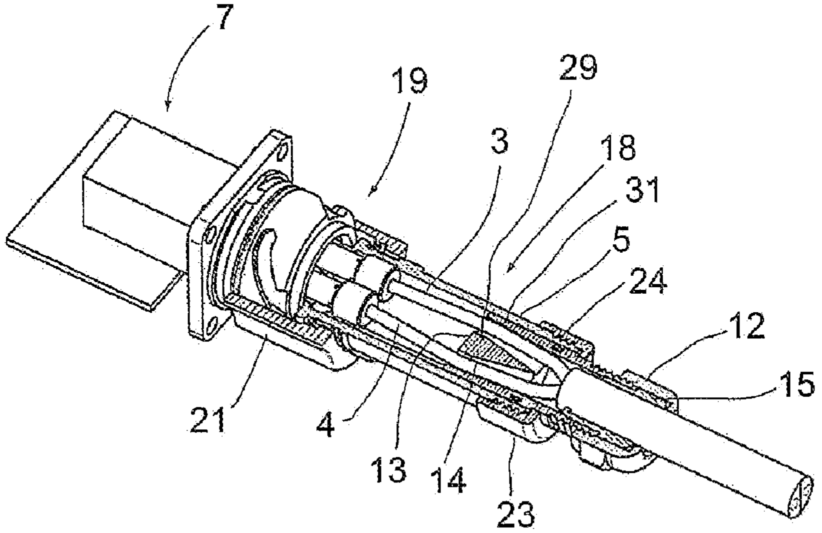
FIG. 5 is a horizontal sectional view showing the connection device of FIG. 1 in the connected condition.
Figure 6:
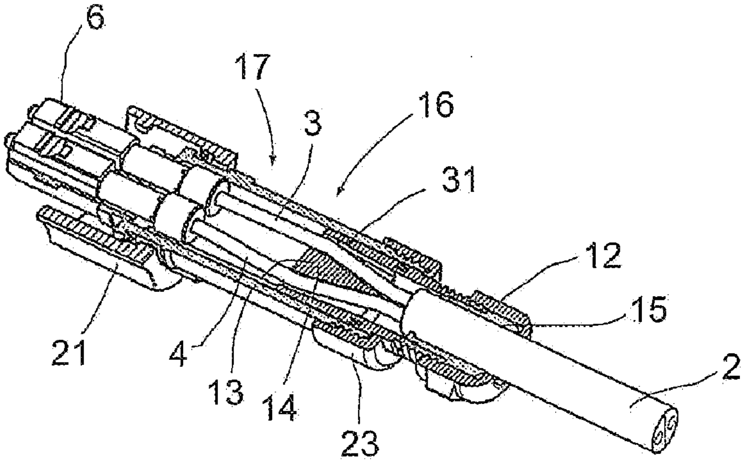
FIG. 6 is a horizontal sectional view showing the connection device in the unconnected condition.

FIG. 5 and FIG. 6 are two perspective horizontal cross-sectional views, FIG. 5 showing connection device 1 connected to signal connector 7, and FIG. 6 showing connection device 1 in the unconnected condition.

At front part 10 of housing 5, union nut 21 is screwed onto the corresponding thread of signal connector 7. Insertion member 22, which contains spreading device 14, is screwed to the rear end of housing 5. Strain relief device 12 is screwed onto insertion member 22 together with clamping device 15 to secure cable 2 to strain relief device 12 in such a way that it is capable of resisting tensile forces and to thereby prevent tensile loads which may be imparted to cable 2 from being transferred to plug 6.

Threaded connection 23, which is used for firm attachment of insertion member 22, is provided with a seal 24 to prevent ingress of moisture.

Plug 6 is in locked position 19, in which it is locked to the socket (not shown). The locked position is when inner plug housing part 26 and outer plug housing part 27 are aligned with each other, as shown in FIG. 2. When outer plug housing part 27 is moved relative to inner plug housing part 26 in a rearward direction; i.e., in a direction toward the strain relief device, signal conductors 3 and 4 shorten in their longitudinal extent, because outer plug housing part 27 is fixedly joined to the housing, and thus also to cable 2 at strain relief device 12.

If signal conductors 3 and 4 were straight, high stiffness would be present in the longitudinal direction, which would make it difficult to achieve a shortening in the longitudinal direction by kinking the signal conductors. In that case, there would be undefined conditions, which over time could have detrimental effects on the signal conductor.

Here, however, spreading device 14, which acts as a deflection device 13, ensures well-defined bending of signal conductors 3 and 4, so that the longitudinal stiffness of signal conductors 3 and 4 is reduced, and that longitudinal compression causes conductors 3 and 4 to move outwardly at the bending point, resulting in a reduction in extent in the longitudinal direction. Because of this, outer plug housing part 27 can be longitudinally moved relative to inner plug housing part 26, which allows locking mechanism 8 to be locked or released after union nut 21 has been removed and, thus, the firm connection of housing 5 to signal connector 7 has been eliminated.

As shown in FIG. 5, connection of a signal connector 7 causes signal conductor 3 to move outwardly by a distance 29 at bending point 31. Thus, relative movement of plug 6; i.e., of outer plug housing part 27, relative to the signal conductor produces a defined lateral movement of the signal conductor at bending point 31.

The present invention is not limited to the embodiments described herein, reference should be had to the appended claims.

| List of Reference Numerals | |
|---|---|
| 1 | connection device |
| 2 | cable |
| 3 | signal conductor |
| 4 | signal conductor |
| 5 | housing |
| 6 | plug |
| 7 | signal connector |
| 8 | locking mechanism |
| 9 | relative movement |
| 10 | housing part |
| 11 | securing device |
| 12 | strain relief device |
| 13 | deflection device |
| 14 | spreading device |
| 15 | clamping device |
| 16 | less deflected position |
| 17 | released position |
| 18 | more deflected position |
| 19 | locked position |
| 20 | ferrule |
| 21 | union nut |
| 22 | insertion member |
| 23 | threaded connection |
| 24 | seal |
| 25 | plug housing |
| 26 | plug housing part |
| 27 | plug housing part |
| 28 | locking elements |
| 29 | distance |
| 30 | aperture |
| 31 | bending point |

What is claimed is:

1. A connection device for connecting a cable having at least one signal conductor to a signal connector, the connection device comprising:

a housing, the at least one signal conductor being disposed in the housing, and the housing having at least one securing device configured to detachably secure the housing to the signal connector;

a plug disposed on the housing, the plug having a locking mechanism lockable and releasable with the signal connector via a respective movement of at least one part of the housing relative to the at least one signal conductor, the housing having a strain relief device configured to provide strain relief for the plug; and a deflection device configured to deflect the at least one signal conductor into a deflected position so that a movement of the at least one part of the housing relative to the plug results in a defined lateral movement of the at least one signal conductor so as to provide a corresponding length compensation.

2. The connection device as recited in claim 1, wherein the at least one signal conductor includes at least one optical waveguide.

3. The connection device as recited in claim 1, wherein the at least one signal conductor includes first and second signal conductors and the deflection device includes a spreading device so as to space the first and second signal conductors with a defined spacing within the housing.

4. The connection device as recited in claim 1, wherein the housing is fixedly coupled to the plug.

5. The connection device as recited in claim 1, wherein the strain relief device includes a clamping device coupled to the housing and configured to securely clamp the cable.

6. The connection device as recited in claim 1, further comprising a spring device configured to bias the at least one signal conductor away from the deflection device and into a less deflected position.

7. The connection device as recited in claim 6, wherein the less deflected position of the signal conductor corresponds to a release position of the plug and a deflected position of the signal conductor corresponds to a locked position of the plug.

8. The connection device as recited in claim 7, further comprising a ferrules that projects forwardly of the plug in the release position.

9. The connection device as recited in claim 1, wherein the securing device includes a threaded securing device having a union nut.

10. The connection device as recited in claim 9, wherein the union nut is captively received on the housing and is axially movable.

11. The connection device as recited in claim 1, wherein the deflection device is disposed on an insertion member inserted into the housing.

12. The connection device as recited in claim 11, wherein the insertion member is coupled to the housing via a threaded connection.

13. The connection device as recited in claim 1, wherein the strain relief device includes a seal.

14. The connection device as recited in claim 1, wherein the plug includes at least a first plug housing portion and a second plug housing portion.

15. The connection device as recited in claim 14, wherein the first plug housing portion is configured to accommodate the at least one signal conductor and the second plug housing portion is coupled to the housing.

16. The connection device as recited in claim 14, wherein the locking mechanism of the plug includes locking elements disposed on the first plug housing portion that are configured to release the plug from the signal connector via a movement of the second plug housing portion relative to the first plug housing portion.

* * * * *